(12) United States Patent
Kinoshita

(10) Patent No.: US 6,528,022 B1
(45) Date of Patent: Mar. 4, 2003

(54) OZONE GENERATING APPARATUS AND CORONA GENERATING APPARATUS

(76) Inventor: Yukio Kinoshita, 7-8, Mikanohara-cho 2-chome, Hitachi-shi, Ibaraki 316-0026 (JP)

(*) Notice: Subject to any disclaimer, the term of this patent is extended or adjusted under 35 U.S.C. 154(b) by 0 days.

(21) Appl. No.: 09/714,957
(22) Filed: Nov. 20, 2000
(30) Foreign Application Priority Data Nov. 29, 1999 (JP) .......................................... 11-375963

(51) Int. Cl.⁷ .............................................. B01J 19/08
(52) U.S. Cl. .............................. 422/186.04; 422/186.07
(58) Field of Search .......................... 422/186.04, 186.07

(56) References Cited

U.S. PATENT DOCUMENTS 3,865,733 A * 2/1975 Taylor ........................ 250/532
3,933,608 A * 1/1976 Haas et al. .................. 204/164
5,520,887 A * 5/1996 Shimizu et al. ........ 422/186.08

* cited by examiner

Primary Examiner—Kishor Mayekar
(74) Attorney, Agent, or Firm—Antonelli, Terry, Stout & Kraus, LLP

(57) ABSTRACT

One of the electrodes is covered an insulated material outer skin and is formed with a long wire shape, a band shape or a plate shape. Another of the electrodes is formed with a bare wire by suiting the various shapes and is formed along another insulated core wire and is arranged closely contact with a parallel shape, a right angle shape, a spiral shape, a net shape or a zigzag shape. Accordingly it is possible to lower the voltage. The both electrodes are separated electrically and mechanically using an insulated material and in an ozone generation portion the both electrodes are separated completely.

21 Claims, 13 Drawing Sheets

Fig. 5A
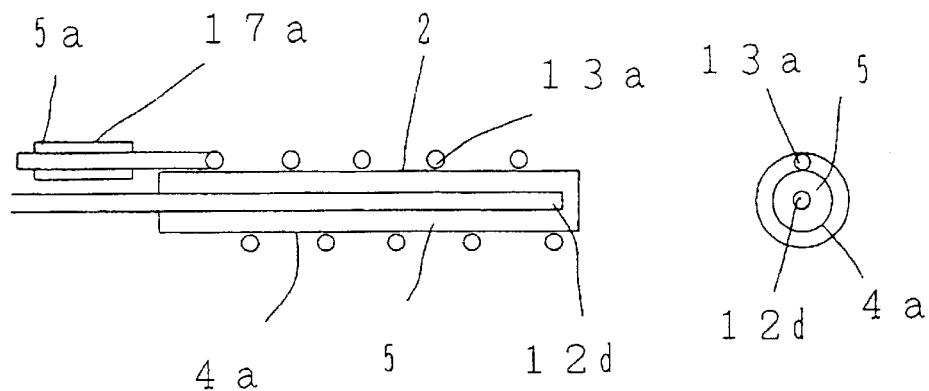
Fig. 5B
Fig. 5C
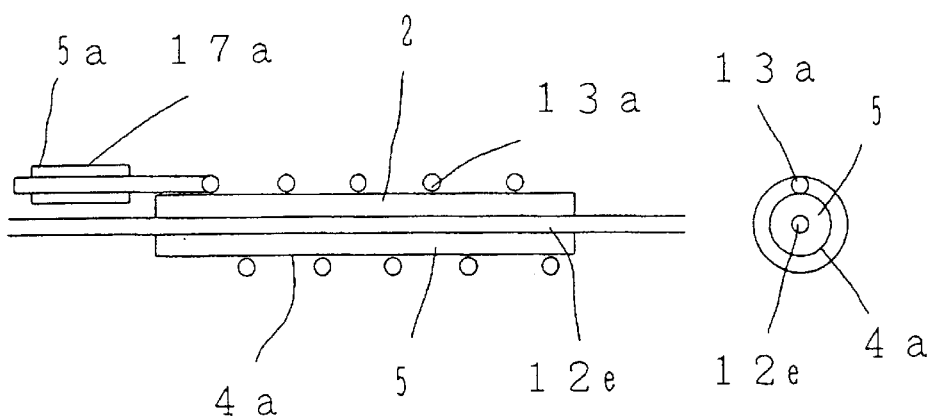
Fig. 5D

OZONE GENERATING APPARATUS AND CORONA GENERATING APPARATUS

BACKGROUND OF THE INVENTION

1. <Technical Field to which the Invention Belongs>

The present invention relates to an ozone generating apparatus and a corona generating apparatus used for a sterilization, a deodorization, a chemical substance decomposition, and a chemical reaction promotion etc.

2. <Prior Art>

In a conventional ozone generating apparatus, between opposed electrodes (a space distance or an insulating material) which are separated to not occur a dielectric breakdown an ozone occurs by applying a single direct current having a high voltage or by overlapping an alternative current and or by applying singly an alternative current voltage.

In the above case, since the high voltage is applied through the space distance and the insulating material from an aspect of a safety, the apparatus becomes a high cost and is not economically. Further, during a corona discharge time, when it is carried out in the air, NOx generates inevitably to a cathode portion, and according to an insulating deterioration and an electric leakage there occurs a function stopping and an ozone generating amount lowers, accordingly it can not employ a practical use without a frequent maintenance and a function keeping. Further, there is not found a means for applying the ozone generation or the corona generation under a high temperature atmosphere. Further, there is not found the corona generating apparatus using microwaves.

The problems to be solved by the present invention are as following:

(1) During an ozone and corona generating time, it makes to lower the voltage which is applied between the electrodes. (2) The both electrodes must be separated completely at an ozone generating portion and a corona generating potion. (3) It makes to get rid of an affect according to NOx during the ozone and corona generating time. (4) It makes to generate efficiently an ozone and corona generating amount. (5) It makes to improve a productivity, etc.

SUMMARY OF THE INVENTION

An object of the present invention is to provide an ozone generating apparatus and a corona generating apparatus wherein during an ozone and corona generating time, the voltage which is applied between the electrodes can be lowered.

Another object of the present invention is to provide an ozone generating apparatus and a corona generating apparatus wherein both electrodes can be separated completely at an ozone generating portion and a corona generating potion.

It will be explained about the realization for lowering the voltage for applying between the electrodes as much as possible, during the ozone and corona generating time. One of the electrodes is covered with an outer skin comprised of an insulated material and is formed with a long line shape, a band shape, a rod shape, or a plate shape. Another of the electrodes is formed with a bare wire suiting with the respective shapes and is arranged closely contact with a parallel shape, a right angle shape, a spiral shape, a net shape, or a zigzag shape along to an insulated core wire. Accordingly, it is possible to lower the voltage.

It will be explained about the realization for separating completely the both electrodes at the ozone and corona generating portion. A basic of this means is that at the ozone and corona generating portion such as even at a surface and in a space, the both electrodes must be separated completely, electrically and mechanically. The ozone and corona generating portion of the electrode pair such as the line shape electrode explained an item (1) portion is arranged in a generating vessel and between different pole terminals at both ends is isolated according to a suitable insulated distance and an insulated material. In this case, it may arrange that one of the electrodes is separated completely and is laid in the generating vessel and another of the electrodes is separated at an outside of the vessel and an electrode terminal is formed. In this case, utilizing effectively the space it can be constituted by plural electrode pairs.

It will be explained about a realization for getting rid of the affect according to NOx during the ozone and corona generating time. A nitrogen removing apparatus using a zeolite is provided at an outside of the ozone and corona generating vessel and the ozone and corona generation is carried out substantially under an oxygen atmosphere, and then the ozone and corona can be generated effectively without the generation of NOx. Further, the ozone and corona generation is carried in the air, since the generation of NOx is not avoidable, during an operation a mechanism for removing NOx in the generating vessel according to the air or the water is provide at an outside of the generating vessel.

In the case of the air, a compressed air is blown suitably into the vessel, further since NOx itself is easily soluble to the water, by installing a shower shape nozzle to a ceiling or a side wall of the ozone and corona generating vessel, an injection cleaning is carried out and NOx is removed and the drainage is carried out through a drainage hole which is provided at a lower portion of the vessel. Further, the compressed air and the water shower can be combined.

Further, since an insulated covering material is made by a heat resistance property material such as Teflon, heat resistance silicon resin, glass or ceramics, a cleaning property can be heightened by hot air or evaporation from an outside. Further, by applying the electric power to the bare wire and the insulated core wire at the outside, they can be functioned as a heater, it is possible to heighten the effects of the cleaning, the purification, and the reaction, etc.

It will be explained about a realization for generating effectively the ozone and corona generating amount. As to the shape and the construction of the electrode bare wire, a simple thin single wire is laid down in parallel to the insulated core wire and also it can be covered with a net shape to an outer skin surface of the insulated core wire or can be arranged with a spiral shape, further an element wire itself is made to fuzz. Accordingly, the corona is generated easily, the ozone and corona generating amount can be increased.

Further, by overlapping to high voltage direct current, by changing frequency (1–30 kHz) of a single pulse and the alternating current, by changing them periodically, the corona generation can be carried out effectively. Further, by changing wavelength of ultraviolet rays which generate at the same time of the corona generation, it can be carried out effectively the generation about an active oxygen from titanium oxide which is coated on the outer skin of the insulated core wire and on an inner wall of the generating vessel and from palladium as a thickener, accordingly the generation of the ozone and corona can be increased widely.

Further, when the particles such as an active carbon having projections on an outer surface, metal, metal plating, vapor deposition ceramics are inserted into a ceramics vessel and a glass vessel and from an outside of the vessel. By irradiating microwaves used in an electronic oven etc., from the projection portions of the particles a corona discharge and a spark discharge occur and a large quantity of the ozone generates in the air or the oxygen atmosphere. The corona discharge and the spark discharge are effective to an organic gas and a harmful gas such as a diesel engine exhaust gas and also to the promotion of the chemical reaction, and without the direct use of the high voltage since an electromagnetic wave is used, the apparatus can be constituted with the safety. In this case, since the ozone is occurred accompanying with the discharge, it is possible to carry out the deodorization, the sterilization, and the chemical reaction promotion etc.

Further, since the heat resistance dielectric material such as the ceramics and the glass is used to an inner portion of the vessel and the vessel itself, they are heated directly according to the microwaves, it is possible to carry out effectively the sterilization and a catalyst action of the chemical reaction. When the these heat resistance dielectric materials are used to the insulated covering of the high voltage discharge wire, the dielectric material can be utilized as the heater. Naturally, the core wire of the high voltage wire and the discharge wire for laying down at an outside can be utilized as the heater in addition to the corona generation which functions originally.

It will be explained about a realization for improving the productivity. The corona generating portion comprises a thin single electrode being an electrode pair or plural electrode pairs and since it can be manufactured simply according to a manufacture method of the electric wire and an optical fiber. Further, they are constituted to arrange easily at random and at an interval electrode pair, the productivity can be improved remarkably compared with the ozone and corona generating apparatus according to the prior art in which a needle electrode is used and it is possible to reduce widely the cost. Further, since the corona generation according to the conductive particles using the microwaves is carried out according to the electromagnetic waves without the direct handling of the high voltage, the apparatus can be formed with the simple construction and the superior safety can be obtained, and further the excellent maintenance property can be attained and a superior total productivity can be obtained.

BRIEF DESCRIPTION OF DRAWINGS

FIGS. 5A–5D are views showing an example of an ozone or a corona generating portion in which a core wire is formed with a hollow shape according to the present invention;

DESCRIPTION OF THE INVENTION

Figure 1A:
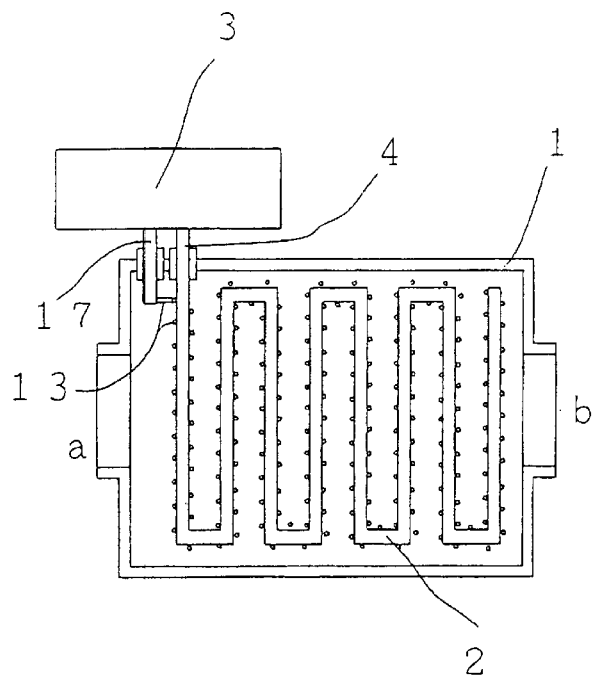
FIGS. 1A and 1B are cross-sectional views showing an ozone generating apparatus according to the present invention.
Figure 1B:
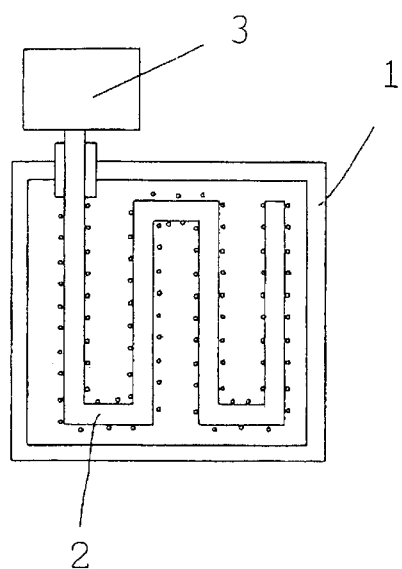

Hereinafter, an embodiment for carrying out according to the present invention will be focused to an ozone generation and it will be explained referring to drawings. FIG. 1A shows a cross-sectional view of an ozone generating apparatus and FIG. 1B shows a side cross-sectional view of the ozone generating apparatus. An ozone generating apparatus 1 has an ozone generating portion 2 and a cross-section of this ozone generating portion 2 is a thin circular shape, a band shape, a plate shape, or a hollow shape thereof. An electrode bare wire 13 is constituted by a bare single wire and an element wire which are stretched in parallel by closing contact at an outside of an insulated core wire 4, and has a spiral winding or a net shape. One wire (in figure) and plural wires are received at random or regularly in the ozone generating vessel 1 by maintaining the permeability.

The direct current singly (more than 5000 V) or a pulse having 1 kHz–30 kHz, and a high frequency voltage (⅓ degree of the direct current) are overlapped and the voltage from the alternative current singly is applied to a terminal of the ozone generation portion 2, and a large quantity of the ozone is generated. An insulated wire 17 is one for ensuring the safety from an electric leakage and an electric shock etc., from a conductive member 13 and is arranged at a port lead portion of the ozone generating apparatus 1 and between the high voltage power sources. A reference numeral a is an intake port of air and oxygen and a reference numeral b is an ozone blowout port.

Figure 1C:
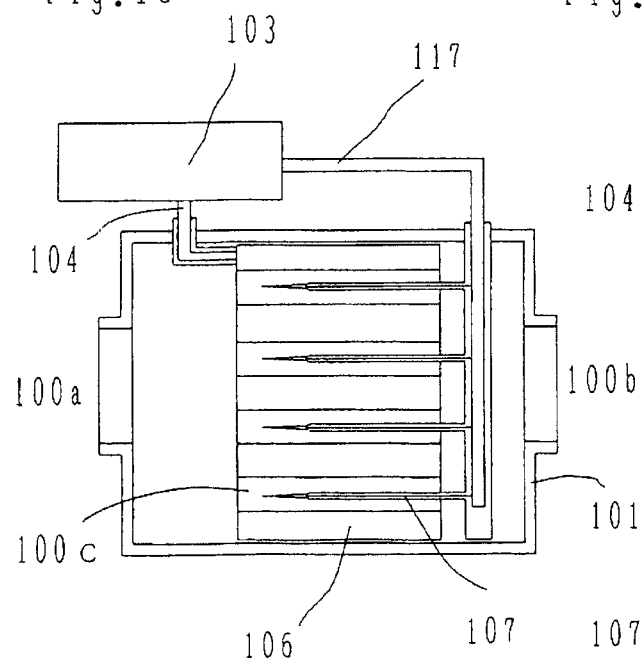
FIGS. 1C and 1D are side cross-sectional views showing an ozone generating apparatus according to the prior art.
Figure 1D:
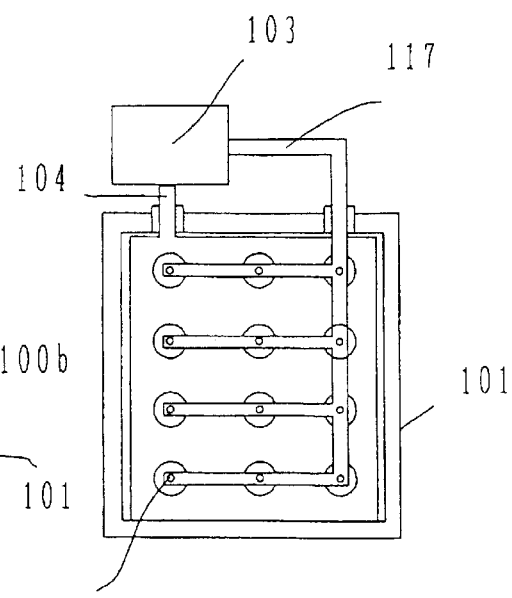

In FIGS. 1C and 1D, between a conventional needle electrode 107 and a cylindrical shape electrode 106, by applying the electricity of the high voltage direct current or the alternating current generated in a high voltage power source 103 is overlapped, and a corona discharge is occurred and the ozone is generated incidentally. However, this structure is inferior far behind compared with that of the present invention in which the ozone is generated positively. When the same amount of the ozone of the present invention is generated in the conventional apparatus, it necessities a large size one and a complicated structure one and one having a high cost. Reference numeral 104 and 117 are high voltage wires. A reference numeral c is an admission port of a cylindrical shape electrode 106 which opposes to the needle electrode 107.

Figure 2A:
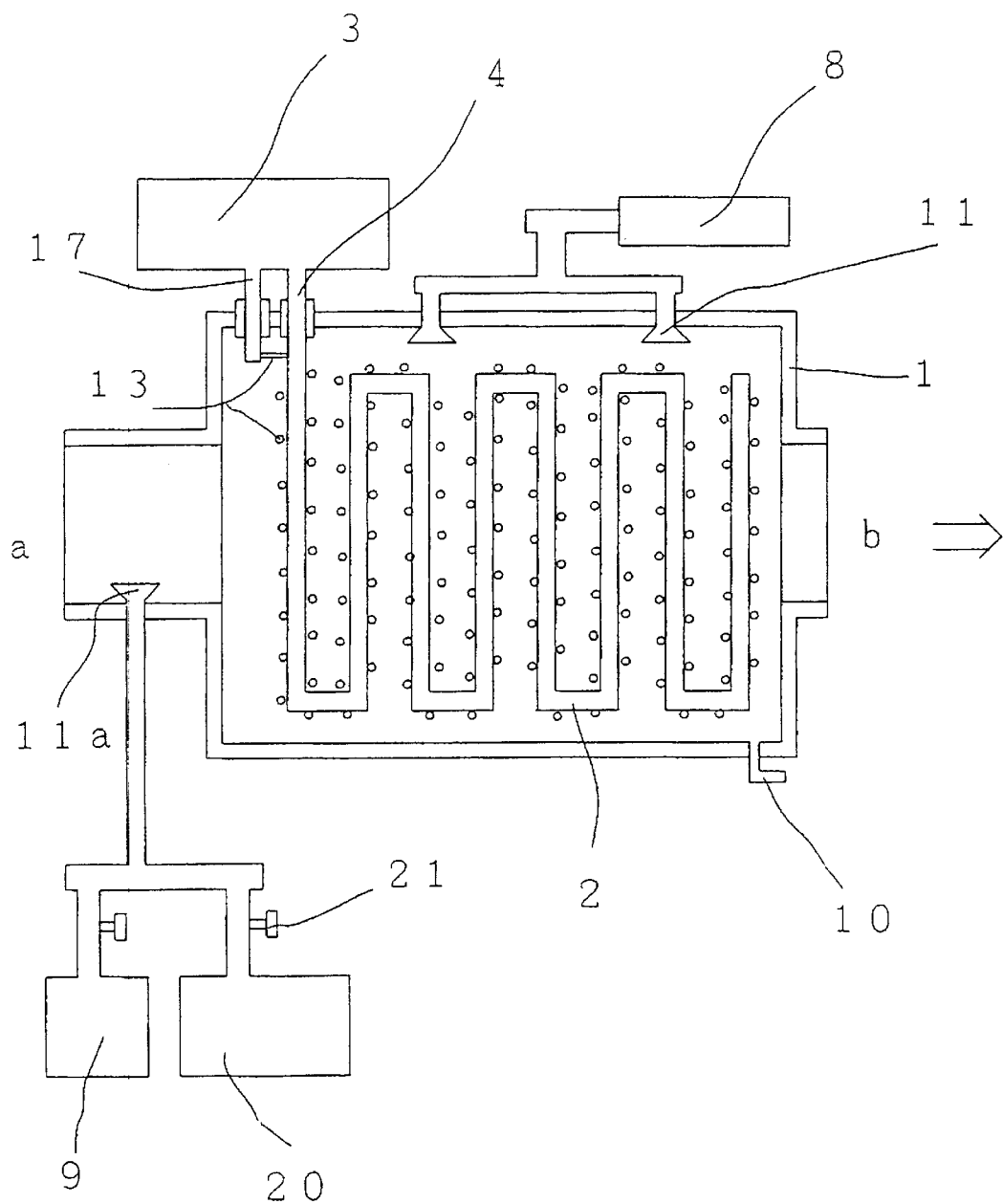
FIG. 2A is an explanatory view showing a generation countermeasure of NOx according to the present invention.

FIG. 2A shows the ozone generating apparatus in which an ozone generating unit 2 according to the present invention is utilized and is a system for performing NOx countermeasure which is commonly associated with the ozone generation according to the air corona discharge. NOx generated during the ozone generating time adheres to a vicinity of the bare electrode wire 13 and it lowers the electric leakage and the ozone generating function. To keep the functions, it is necessary to carry out frequently the maintenance and then the time and the cost becomes enormous.

Herein, since the system for removing NOx is incorporated, the above stated defects can be dissolved. In other words, using the compressed air, vapor, and water, NOx generated by the corona discharge can be removed according to the need. To make it possible, the insulated core wire of the ozone generating unit 2 is sealed electrically and completely or is isolated electrically and completely against the bare wire 13, accordingly the above stated desire can be realized for the first time.

A generator 8 is provided at an outside of the vessel 1 and water and vapor are generated and are injected according to a nozzle 11. Further, a generator 9 for generating the compressed air is provided, the effect of the removal of NOx and dusts can be exhibited according to the drying after the cleaning. Further, the generator 8 and the generator 9 can be installed separately.

Next, to restrain completely the generation of NOx, as the ozone generating system in the oxygen atmosphere, an adsorption type oxygen generator 20 such as a zeolite etc. and an oxygen pump can be installed. As to the generation of the ozone, under the atmosphere having oxygen of 100%, the ozone generating efficiency can be improved remarkably. A reference numeral 11a is a nozzle for injecting the oxygen and the compressed air and a reference numeral 10 is a drain port for the drainage.

Figure 3A:
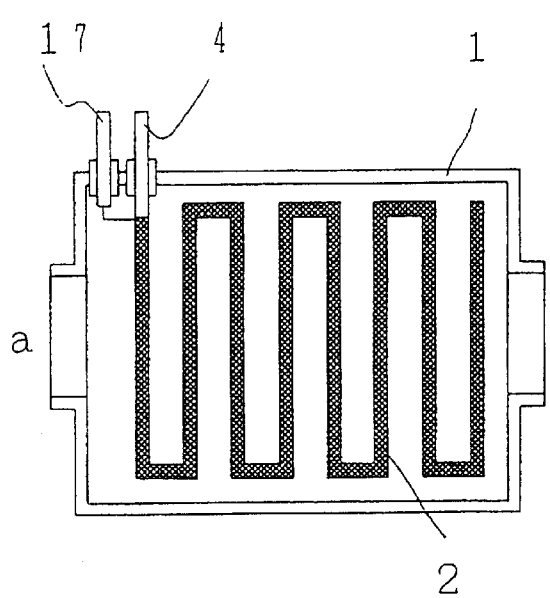
FIGS. 3A–3D are explanatory views showing a condition in which an ozone or a corona generating unit is received in a generating vessel.
Figure 3B:
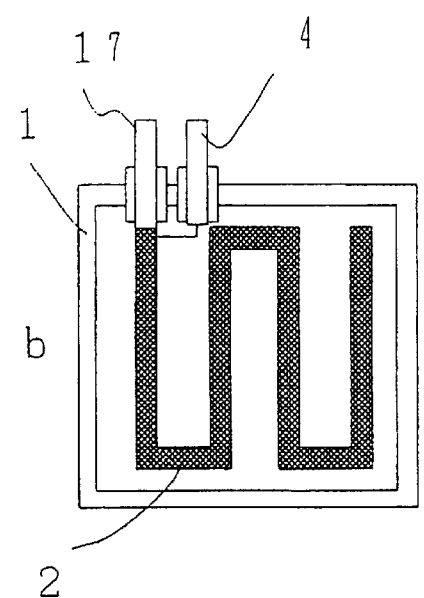

FIGS. 3A–3D show an embodiment in a case in which the ozone generation unit 2 according to the present invention is received in the vessel 1 and in FIGS. 3A and 3B it is constituted by a single generating unit. An end portion of the inner portion of the ozone generating vessel 1 are sealed completely, electrically, and mechanically, and an outlet from the generating vessel 1 is one portion. When the ozone generating unit 2 is formed with a flexible thin wire, at the installing time the unit can be inserted easily to the generating vessel 1. Accordingly the productivity can be improved remarkably and the cost performance can be down remarkably.

Figure 3C:
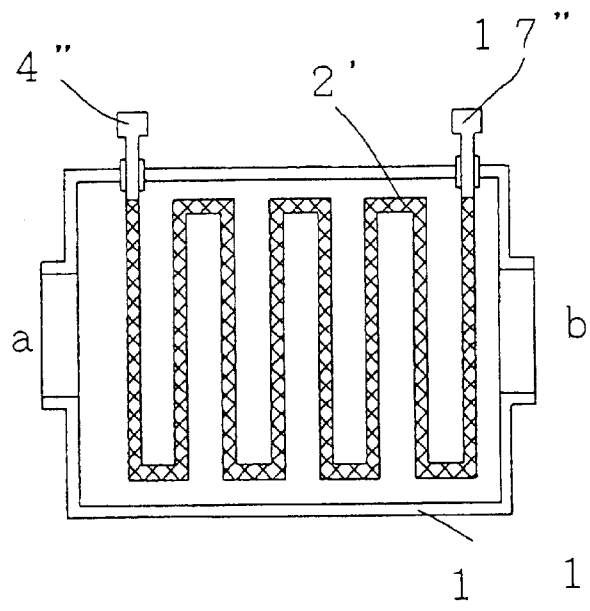
Figure 3D:
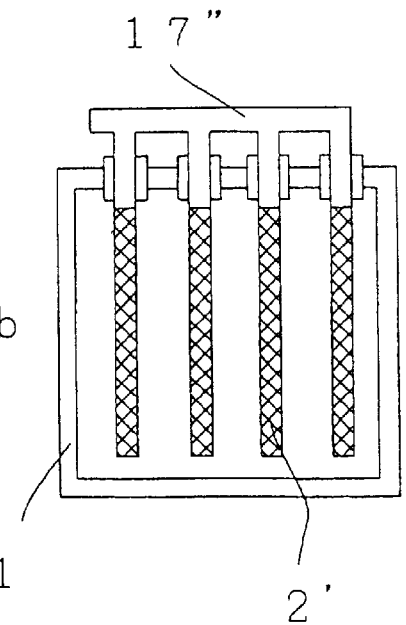

In FIGS. 3C and 3D, the ozone generating unit 2' is manufactured using comparatively rigid material, and further by combining the plural members the ozone generating unit 2' is received in the generating vessel 1 and then the ozone generating apparatus is constituted. As a special application example, the insulated core wire 4" of the generating unit 2' is made with a hollow shape and in the hollow portion the liquid having a conductive property is sealed tightly and an electrode of the core portion is formed, or the hollow portion is made as a pipe having a suitable thickness and the liquid is made to circulate. Accordingly, when the generating vessel 1 is heated and has the high temperature, to restrain the temperature less than 400° C. of the extinction of the ozone, the cooling water is flown into and then they are used so as to prevent the lowering the generating effect of the ozone.

Figure 4A:
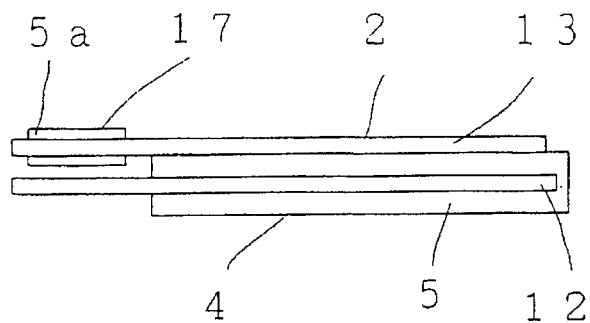
FIGS. 4A–4F are views showing an embodiment of a structure of an ozone or a corona generating portion having a circular cross-section shape according to the present invention.
Figure 4B:
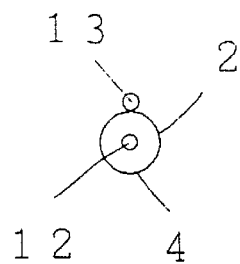
Figure 4C:
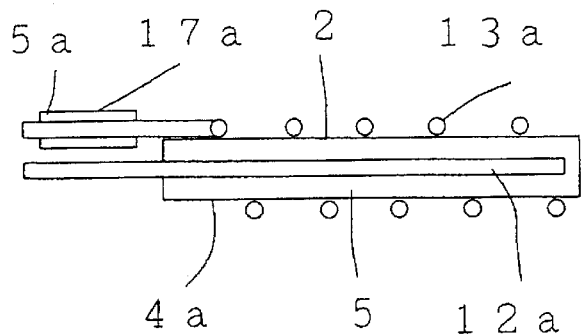
Figure 4D:
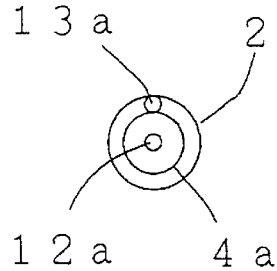
Figure 4E:
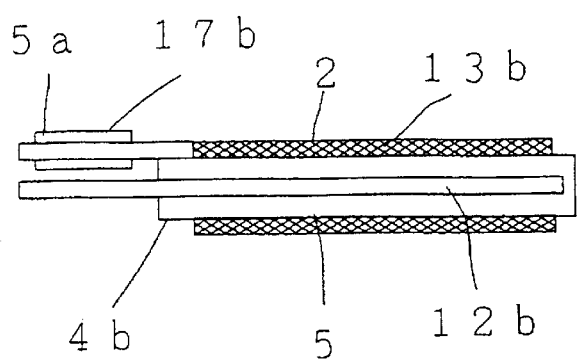
Figure 4F:
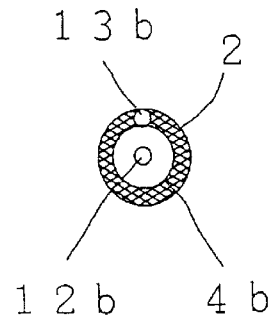

FIGS. 4A–4F and FIGS. 5A–5D are views showing a constitution example of the circular shape and long and narrow ozone generating unit 2. Core wires 12d, 12e shown in FIGS. 5A–5D have hollow shapes. FIGS. 4A, 4C and 4E show cross-sectional views in the long and narrow direction. FIGS. 4B, 4D and 4F show cross-sectional views. In FIGS. 4A and 4B, a core wire 12 is covered by an insulated material 5. Terminal portions of a bare wire 13 which is arranged in parallel with the core wire 12 are covered by an insulated material 5a. The manufacturing method can be carried out simply according to the electric wire and optical fiber manufacturing techniques and the cost performance is excellent. To obtain the heat resistance property, to the insulated materiel 5, Felon, glass, and ceramics etc. are used. To the outer skin portion of the insulated material 5, the metal oxide such as the titanium oxide having nanometer size particles and palladium are coated, then the generation of the active oxygen is promoted by reacting the ultraviolet rays which generate accompanying with the ozone generation, accordingly the generation of the ozone can be carried out effectively. Further, to the inner wall of the generating vessel 1 the above materials are coated similarly and the effect can be raised.

In FIGS. 5A–5D, the core wire 12d or 12e can be formed with the hollow shape or the hollow portion is formed by only the insulated material 5 and in this hollow portion, the conductive liquid is filled up and then the core wire 12d or 12e is formed. The hollow portion is formed with a closed loop shape and using a pump the above liquid is made to circulate. Accordingly, the apparatus has a function of the cooling of the ozone generating portion and a function of the fire fighting in the emergency time, then the quenching temperature of the ozone can be lowered less than of 400° C. Further, in the case of the hollow type electrode, even the shape becomes complicated one, the correspondence to this can be carried out easily and from the aspect of the cost it can be manufactured cheaply.

The bare wire 13 is formed by using the carbon fiber which is stably in the chemical aspect and the wire brake according to the corrosion can be prevented and the bare wire is effective to the improvement of the maintenance and the improvement of the heat resistance property. Even the bare wire 13 and the insulated core wire 4 are not arranged closely contact, they can be arranged separately in parallel and random or regularly.

FIGS. 4C and 4D show the examples in which a bare wire 13b is laid down spiral to the outer skin of an insulated core wire 4b and FIGS. 4E, 4F show the examples in which the bare wire 13, in which a thin element wire has been knitted with a net shape, to the outer skin of the insulated core wire 4b. To the face of the outer skin of the element wire of the bare wire 13 projections are provided, then the ozone generating effect can be increased further.

Figure 6A:
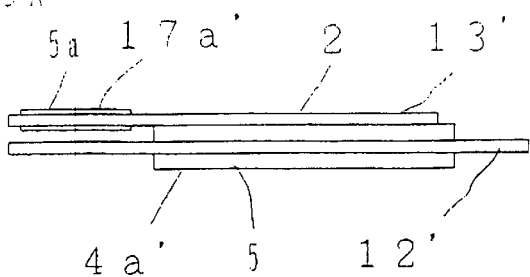
FIGS. 6A–6I are views showing an embodiment of a structure of an ozone or a corona generating portion having a right angle cross-section shape according to the present invention.
Figure 6B:
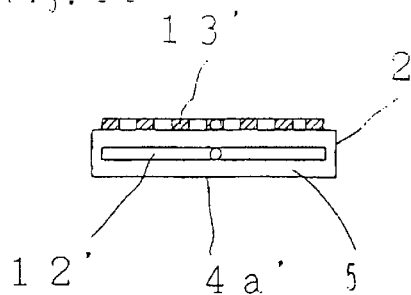
Figure 6C:
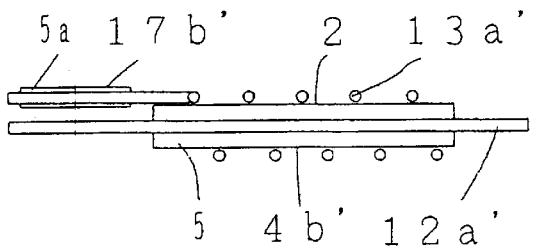
Figure 6D:
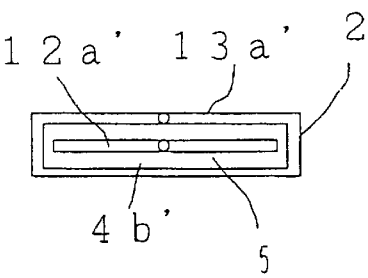
Figure 6E:
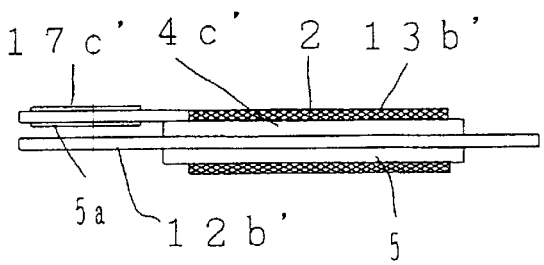
Figure 6F:
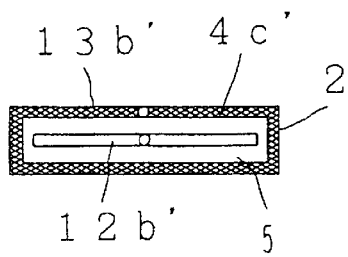
Figure 6G:
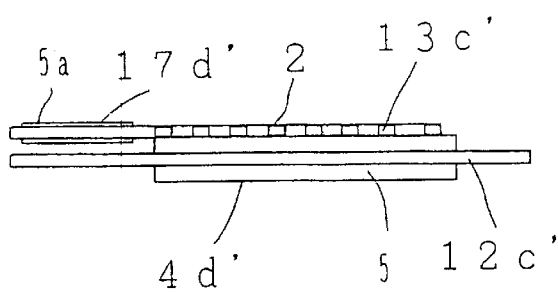
Figure 6H:
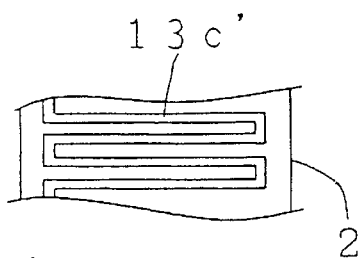
Figure 6I:
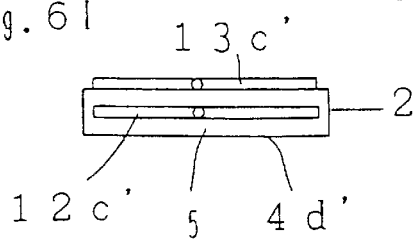

FIGS. 6A and 6B show the examples in which to a long size face of a cross-section of a right angle shape insulated core wire 4a' plural bare wires 13' are laid down in parallel with a core wire 12' and FIGS. 6C and 6D show the examples to the outer skin of the insulated core wire 4b', a bare wire 13a' is wired spiral along to the core wire 12a'. FIGS. 6E and 6F show the examples using a net shape bare wire 13b' the bare wire is laid down to the outer skin of the insulated core wire 4c', and FIGS. 6G and 6H show the examples using a zigzag shape bare wire 13c' and the bare wire is laid down to the outer skin of a insulated core wire 4d'.

Figure 7A:
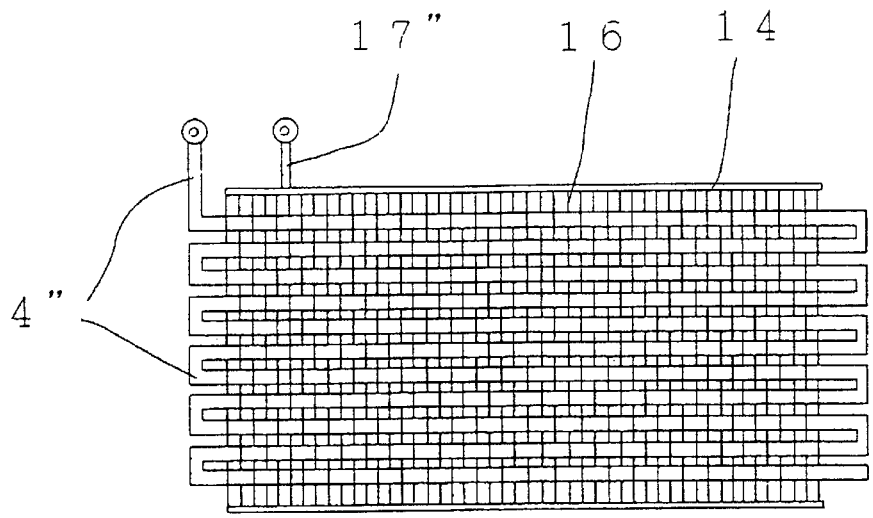
FIGS. 7A and 7B are views showing an embodiment of a structure of a cloth shape ozone or a cloth shape corona generating portion.

FIG. 7A shows an example in which by knitting in a cloth shape the insulated core wire 4" or a hollow insulated core wire 4a" to the weft thread and bare wires 16, 16a to the warp thread, then the ozone generating unit is formed and a mechanical system laminated filter is formed and the apparatus has a single function or a complex function. The bundled insulated electrode 17" is bundled to a wrap thread shape element wire 16 according to a connecting wire 14. A single sheet member is folded and inserted in the vessel and plural members are laminated and used. Further, the cloth shape insulated core wire 4" and the cloth shape element wire 16 as the discharge wire can be laminated alternatively.

Figure 7B:
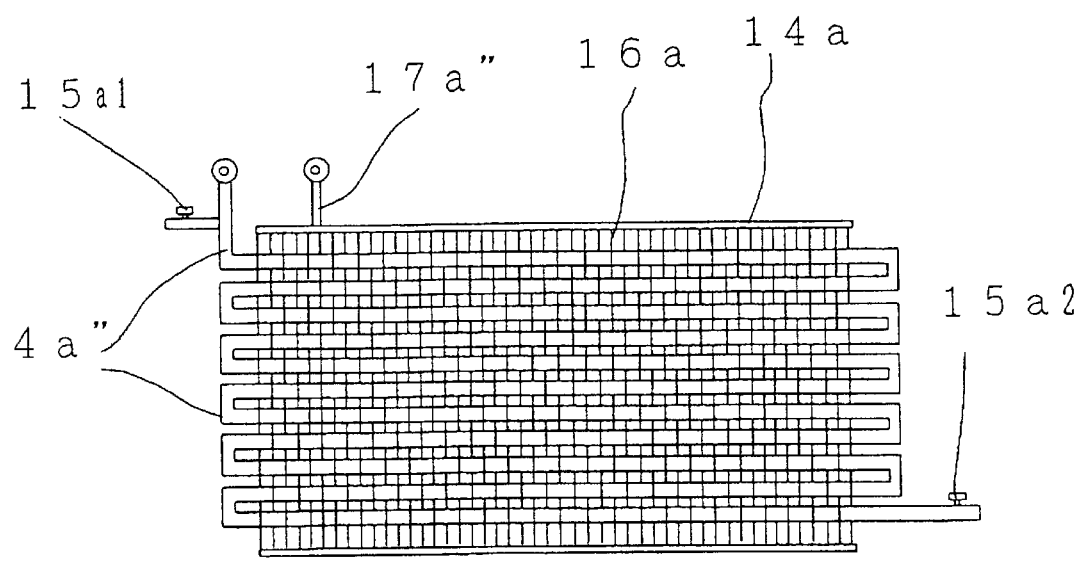

In FIG. 7B, a hollow shape insulated core wire 4a" is formed by filling up the core wires 12d, 12e shown in FIGS. 5A–5D to the electrolyte and by knitting in the cloth shape this as the weft thread and a bare wire 16a as the warp thread, and by filling up tightly the liquid in the hollow portion and it can be used stationary, it can used the electrolyte and the cooling performance can be obtained. In a bundled insulated electrode 17a", the weft thread shape element wire 16a is bundled by a connecting wire 14a. This is effective when the ozone generating atmosphere is the high temperature.

Figure 8A:
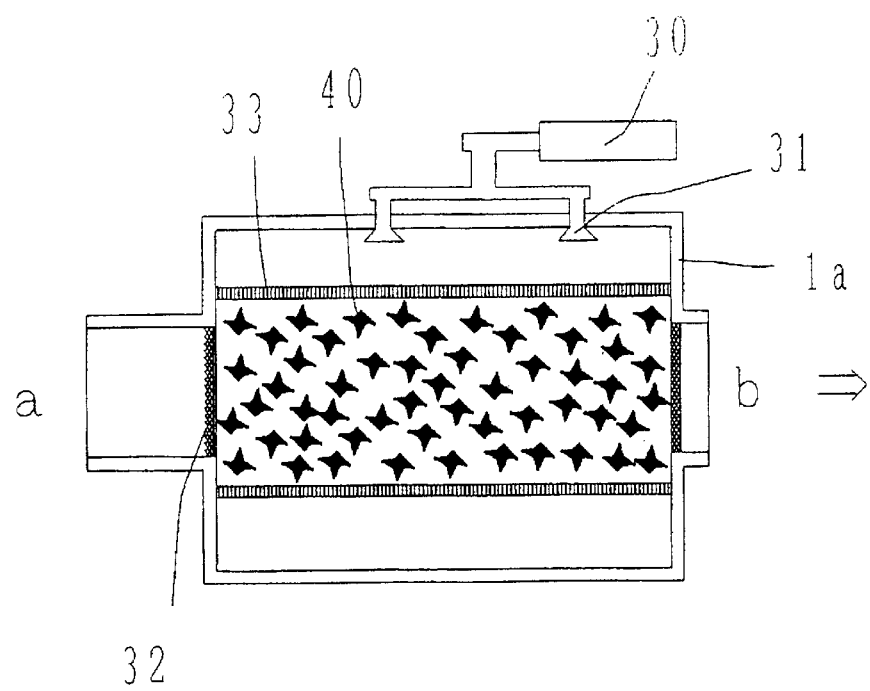
FIGS. 8A and 8B are views showing an example in which a structure for generating the ozone and the corona by exciting projection metal particles by microwaves according to the present invention and an ozone and a corona generating portion using a high voltage discharge electric wire according to the present invention are combined.
Figure 8B:
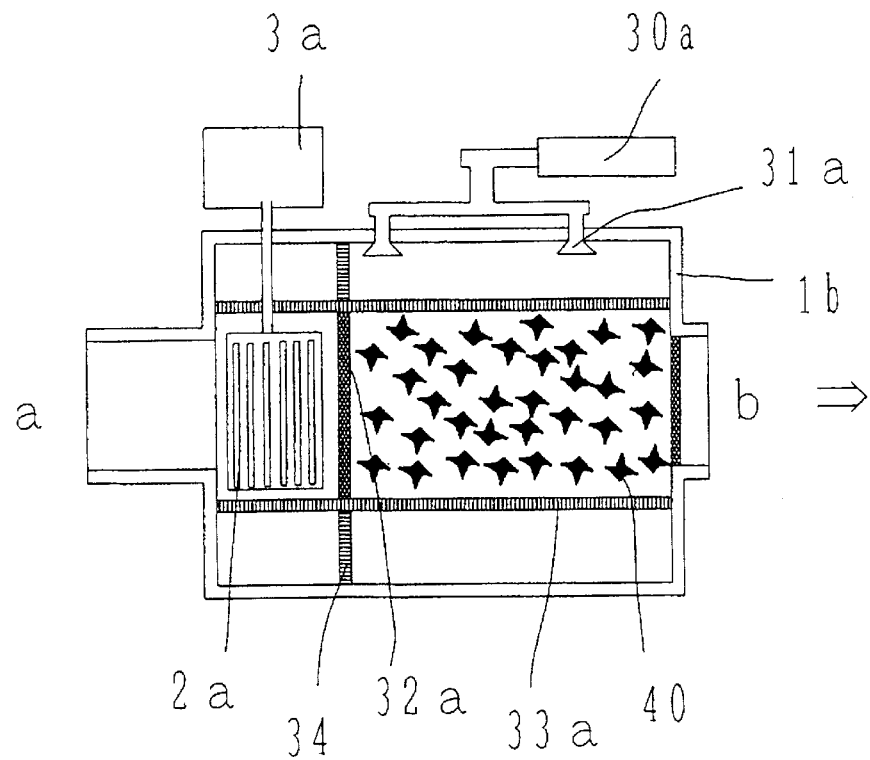

FIGS. 8A and 8B show a structure view showing an apparatus for generating the large quantity of the ozone in the air and the oxygen atmosphere etc. by radiating the microwaves to the particles in which the outer skin such as the active carbon, the metal plating, the vapor deposition to the ceramics have the projections and by occurring the spark or the corona discharge. FIG. 8A shows a case in which the microwaves are carried out singly, and FIG. 8B shows one example in which the corona using the above stated high voltage discharge wire and the ozone generating apparatus are combined. A processing gas is taken in from an inlet port a portion and is taken out from a discharge port b portion after the processing.

In accordance with the size and the density of the particles, when the ventilation resistance is large, using the high static pressure type blower (not shown in figure) the pressure compensation is carried out. By employing the projection property metal particles 40 such as this metal and the active carbon etc., in the multi-porous property materials, the metal oxides such as copper, nickel, titan, palladium etc. are burdened, and in the materials, except for the above stated multi-porous property materials, to the surfaces these metal oxides are fixed and adhered according to the adhesion and the plating etc. and then the catalyst action is given, accordingly the organic gas, the fine particles, and the decompression of NOx etc. can be performed validly.

Reference numerals 30 and 30a are the microwave generating apparatus, reference numerals 31 and 31a are microwave injecting nozzles and to the corona generating vessels 1a and 1b the electromagnetic wave is injected. The corona generating vessel 1a or 1b is formed with an electromagnetic sealing structure to not leak the microwave to the outside. Reference numerals 33 and 33a are the heat resistance and dielectric property isolating walls which are formed with the heat resistance and dielectric material such as glass, alumina, the heat resistance silicone resin and Teflon etc. and the permeability property of the electromagnetic waves is good and this material has a structure which can endure fully to the dielectric heat according to the microwaves. Reference numerals 32 and 32a are isolating walls having the ventilating property and they hold surely the projection property meal particles 40. A reference numeral 34 is an isolating wall b and can protect the corona generating unit 2a from the microwaves. A reference numeral 3a is a high voltage power source.

Figure 9A:
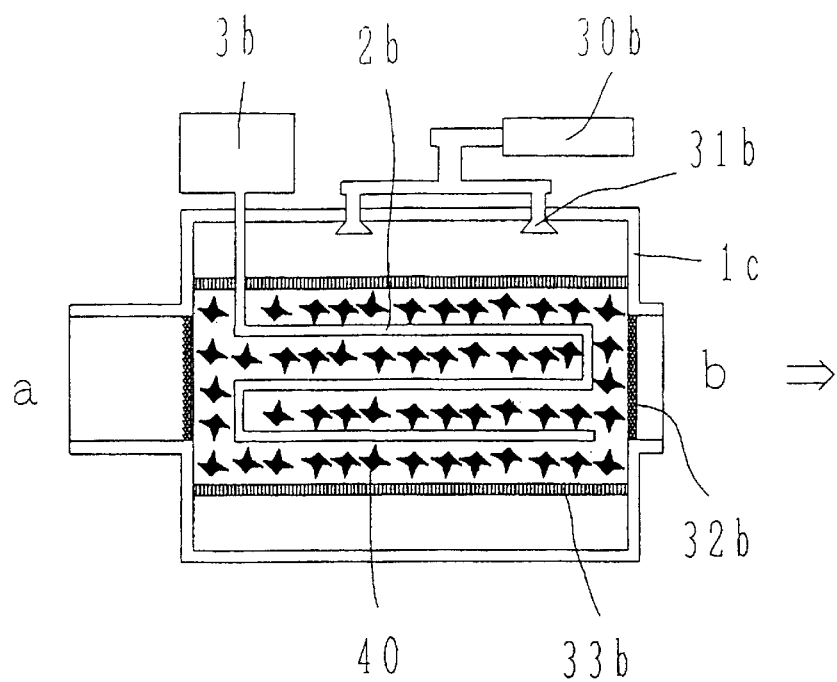
FIGS. 9A and 9B are explanatory views showing a structure for generating additionally the ozone and the corona by exciting microwaves using a structure in which to projection metal particles or a heat resistance dielectric member ball according to the present invention an ozone and a corona generating portion using a high voltage discharge wire according to the present invention are placed side by side.

In FIG. 9A, an insulated core wire 2b is put side by side with the projection property metal particles 40 which are formed by the metal and the active carbon etc. in the corona generating apparatus according to the microwaves shown in FIG. 8A and the ozone generating apparatus. Between the insulated core wire 2b and the projection property metal particles 40, the corona discharge or the spark discharge are occurred, the discharge according to the microwaves and the overlap are functioned additionally. At the same time, to the outer skin of the insulated core wire 2b the ceramics and the heat resistance silicone are used, according to the heating of the microwaves the heater function is given and the gas decomposition reaction can be promoted effectively. To the surface of the outer skin of the insulated core wire 2b the catalysts such as the metal oxide are coated and vapor deposition, and according to the necessity the catalyst effect can be given.

Figure 9B:
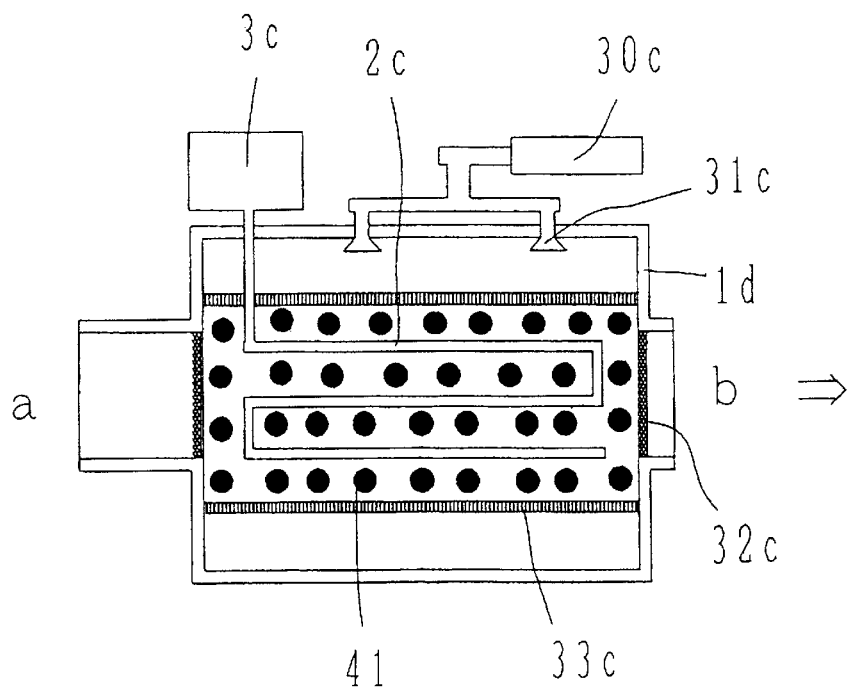

In FIG. 9B, in place of the projection property metal particles 40 shown in FIG. 9A, a ball shape heat resistance dielectric ball 41 which is formed by the heat resistance material such as the ceramics is placed. At the same time, in place of the insulation core wire 2b, the corona generating unit 2c, in which the insulated outer skin is formed by the heat resistance property ceramics etc., is put side by side. From a high voltage power source 3c a high voltage alternating current 2c is applied and the corona discharge is occurred in the generating vessel and the same time using the ultraviolet rays which are irradiated from the discharge wire, according to the active oxygen which are irradiated from the metal oxide being coated to the outer skin of the insulated core wire and the metal oxide being burdened and coated to the heat resistance dielectric ball 41, the reaction is promoted. In this time, the necessary heat is given by the outer skin of the insulated core wire according to the microwaves and dielectric heating of the heat resistance dielectric ball 41.

Reference numerals 3b and 3c are high voltage power sources, reference numerals 30b and 30c are microwave generating means, reference numeral 31b and 31c are microwave injecting nozzles, reference numerals 32b and 32c are isolating walls, reference numerals 33b and 33c are heat resistance dielectric property isolating walls, and reference numerals 1c and 1d are corona generating vessels.

Figure 10A:
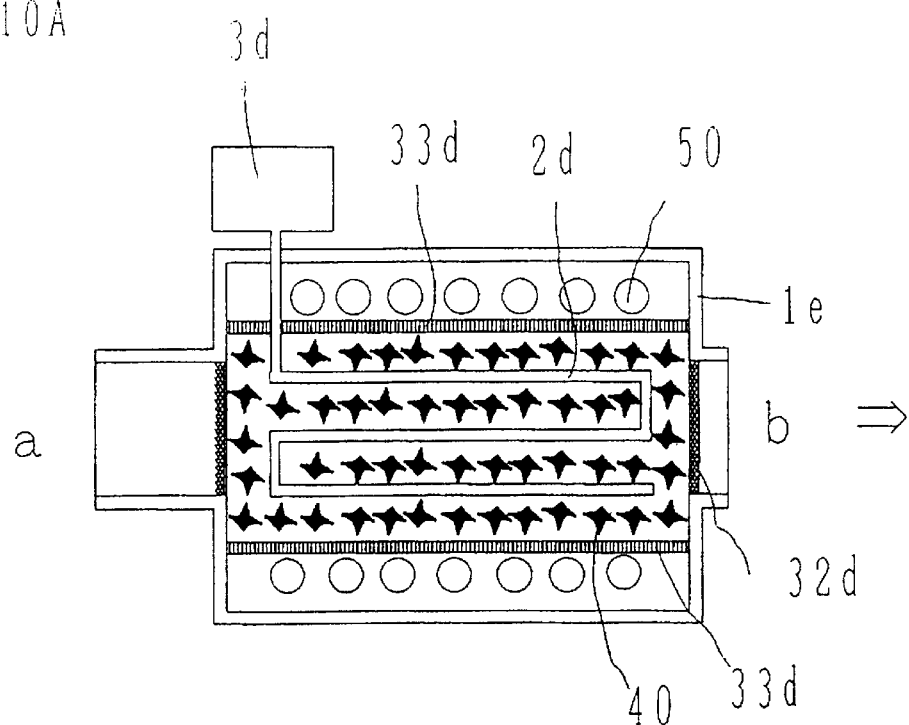
FIGS. 10A and 10B are explanatory views showing a structure for adding an induction heating wire in which a structure in which to projection metal particles according to the present invention a corona and an ozone generating portion using a high voltage discharge wire according to the present invention and a structure for generating the ozone and the corona in which an ozone and a corona generating portion using a high voltage discharge wire are combined simply.
Figure 10B:
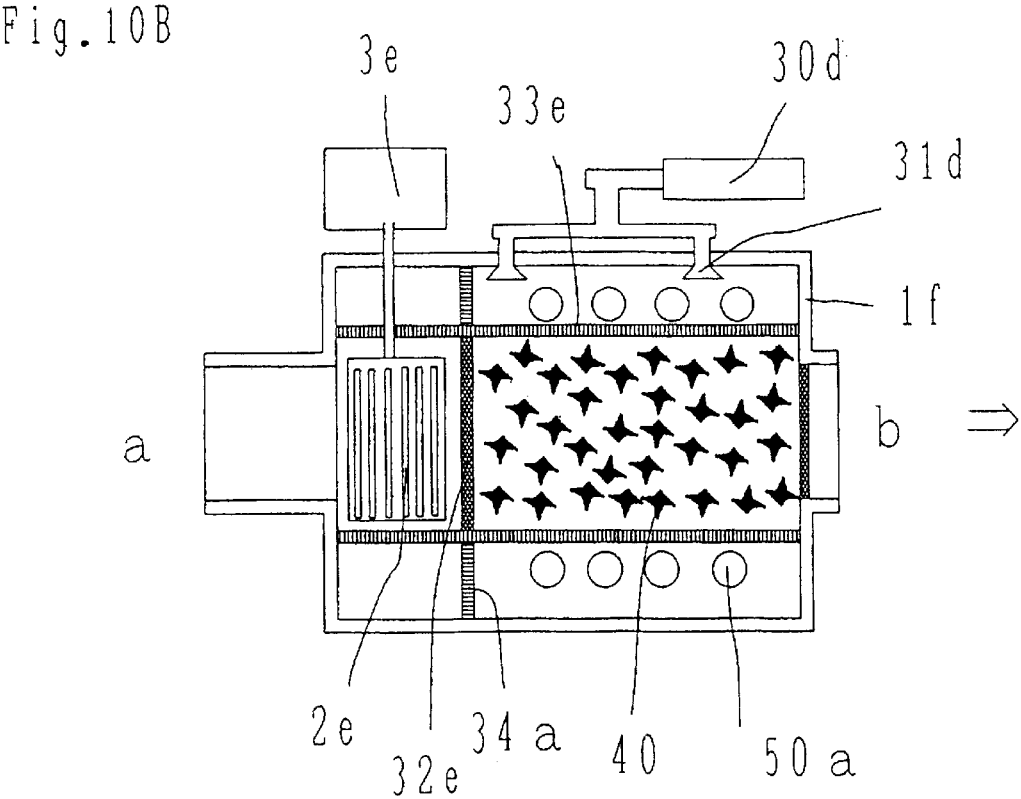

In FIG. 10A, in place of the discharge according to the microwaves and the heating shown in FIG. 9A, the discharge is performed by an insulated core wore 2d and the heating is performed using an induction property heater having an ordinary IH (induction heating) or a resistance heater (not shown in figure). Further, in FIG. 10B, to the structure shown in FIG. 8B an induction property heater 50a and a resistance heater (not shown in figure) are added. By raising the heating capacity the catalyst action is activated and the gas decomposition and in particular the gas formation reaction of the particle shape material etc. is carried out surely.

Reference numerals 3d and 3e are high voltage power sources, a reference numeral 2e is a corona generating unit, a reference numerals 30d is a microwave generating means, a reference numeral 31d is a microwave injecting nozzle, reference numerals 32d and 32e are isolating walls, reference numerals 33d and 33e are heat resistance dielectric property isolating walls, and reference numeral 1e and if are corona generating vessels.

Figure 11A:
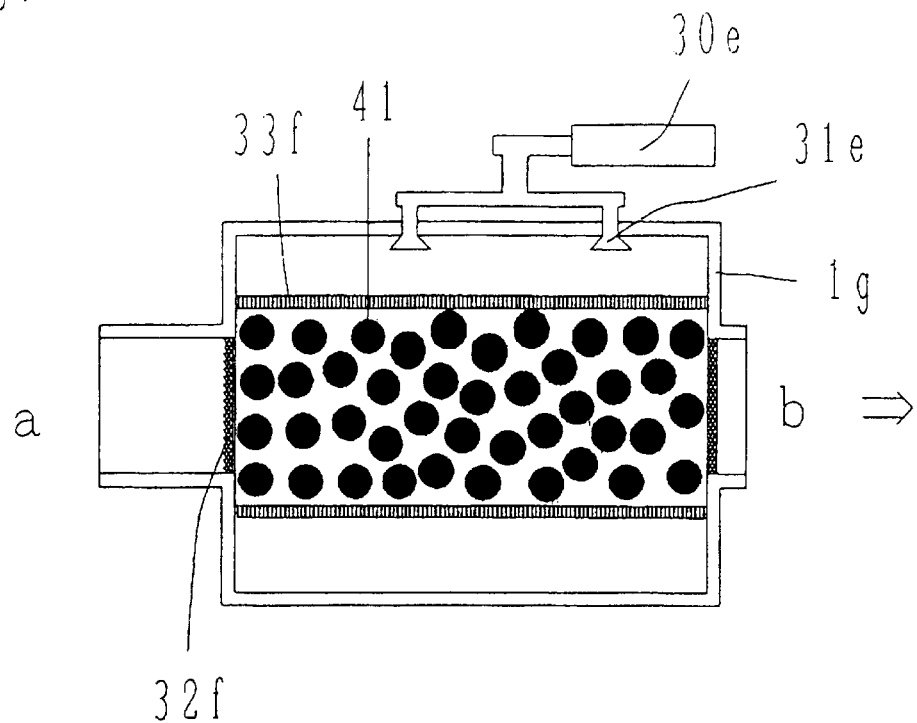
FIGS. 11A and 11B are views showing an example in which a structure for generating the ozone and the corona by exciting a heat resistance dielectric member ball by microwaves and an ozone and a corona generating portion using a high voltage electric wire according to the present invention are combined simply.
Figure 11B:
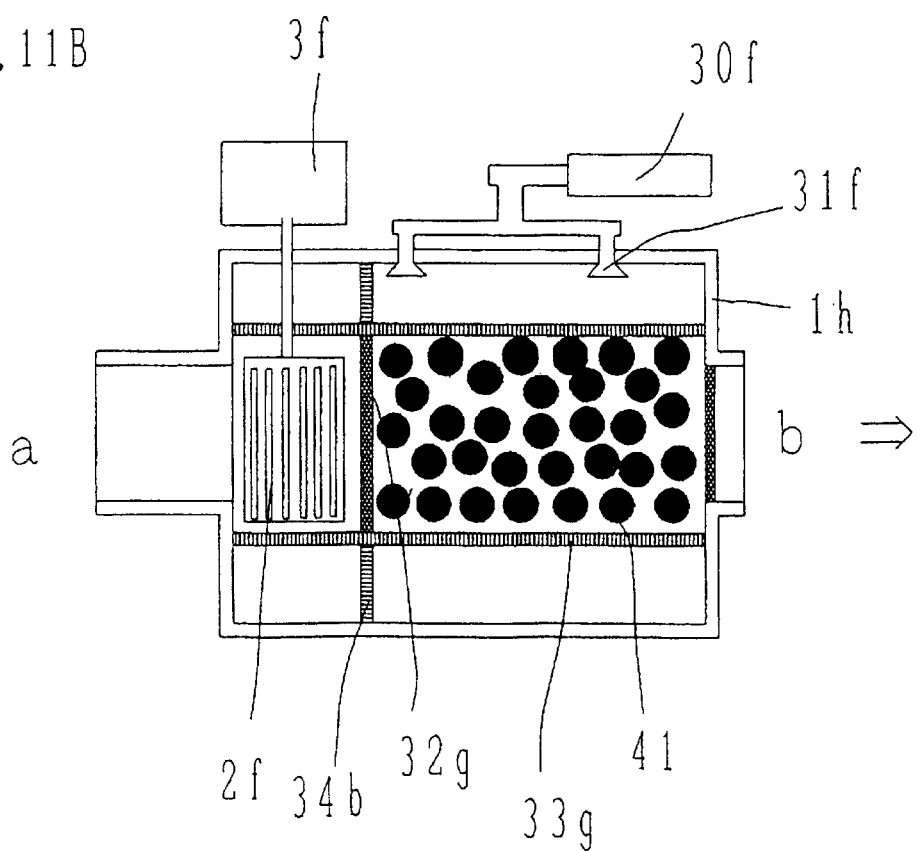

In FIGS. 11A and 11B, in place of the projection property particles 40 shown in FIGS. 8A and 8B, it is placed with the heat resistance dielectric property ball 41 such as the ceramics etc. In FIG. 11A, by irradiating the microwaves generated by a microwave generating means 30e from a microwave injecting nozzle 31e and heat resistance dielectric particles 41 are heated by the dielectric heating. Under the generated high temperature using the catalyst action according to the metal oxides etc. which is burdened to the heat resistance dielectric particles 41 the gas formation of the high molecular waste material and the biomass and the harmful gas etc. are decomposed and to perform to make the harmless. In this case, under the high temperature since only the catalyst action is carried, the temperature of the reaction portion is carried out under the high temperature condition.

Further, in FIG. 11B, in a former stage of the system shown in FIG. 11A, since an ozone and corona generating unit 2f according to the high voltage is provided, the action according to the ozone is added, the reaction according to the gas decomposition etc. is promoted. A reference numeral 3f is a high voltage power source, reference numerals 30e and 30f are microwave generating means, reference numerals 31e and 30f are microwave injecting nozzles, reference numerals 32f and 32g are isolating walls, reference numerals 33f and 33g are heat resistance dielectric property isolating walls, a reference numeral 34b is an isolating wall b, and reference numerals 1g and 1h are corona generating vessels.

Figure 12A:
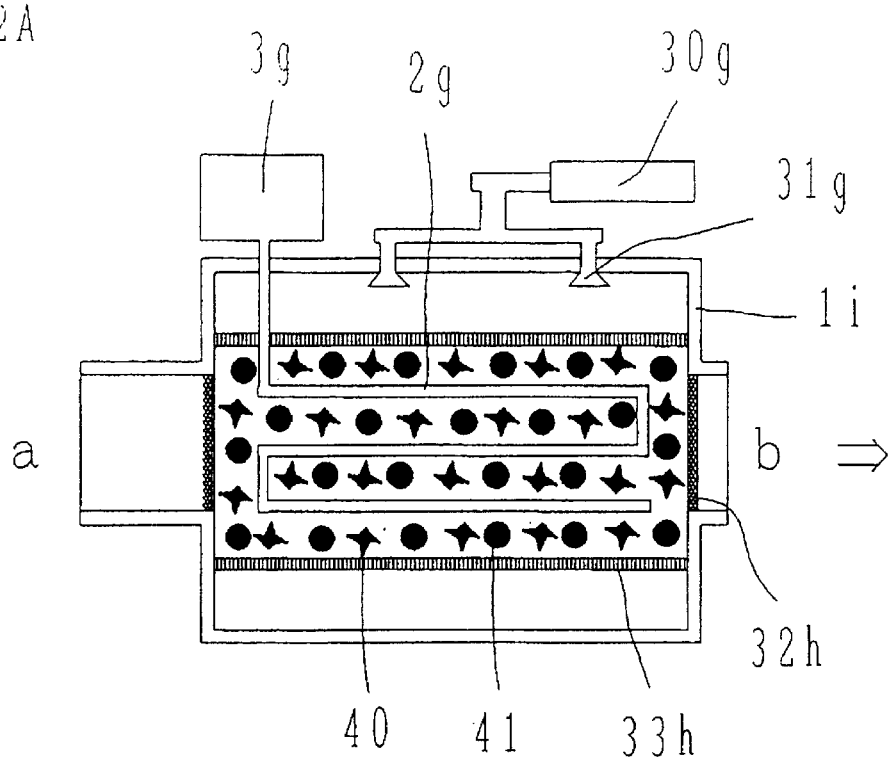
FIGS. 12A and 12B are explanatory views showing a structure for generating the ozone or the corona by combining simply a structure in which to a mixed material of projection metal particles according to the present invention and a heat resistance dielectric member ball a structure for placing side by side an ozone or a corona generating portion using a high voltage discharge wire and an ozone or a corona generating portion.
Figure 12B:
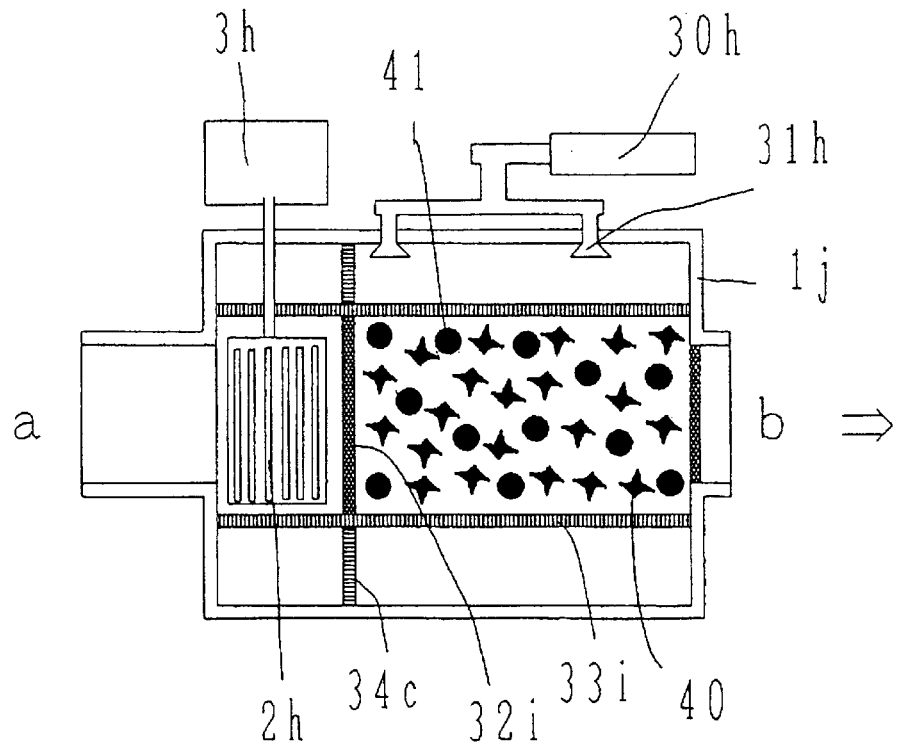

FIG. 12A shows a construction in which in FIG. 9A to the projection property metal particles 40 the heat resistance dielectric ball 41 is added. Further, FIG. 12B shows a construction in which in FIG. 11B to the heat resistance dielectric ball 41 the projection property metal particles 40 is added. The action effect in FIG. 12A is that in addition to the action effect shown in FIG. 9A, since the action between the heat resistance dielectric ball 41 and the microwaves and the high voltage discharge wire are overlapped, the apparatus having the high performance gas decomposition can be provided.

Similarly to this, the action effect in FIG. 12B is that in addition to the action effect shown in FIG. 11B, since the action between the projection property metal particles 40 and the microwaves and the high voltage discharge wire are overlapped, the apparatus having the high performance gas decomposition can be provided. To the above, by adding the induction heating and the resistance heating, it can perform the high temperature condition, and the catalyst effect can be heightened further. Reference numerals 3g and 3h are high voltage power sources, a reference numeral 2g is an insulated core wire, a reference numeral 2h is a corona generating unit, reference numerals 30g and 30h are microwave generating means, reference numerals 31g and 31h are microwave injecting nozzles, reference numerals 32h and 32i are isolating walls, reference numerals 33h and 33i are heat resistance dielectric property isolating walls, a reference numeral 34c is an isolating wall b, and reference numerals 1I and 1j are corona generating vessels.

Figure 13:
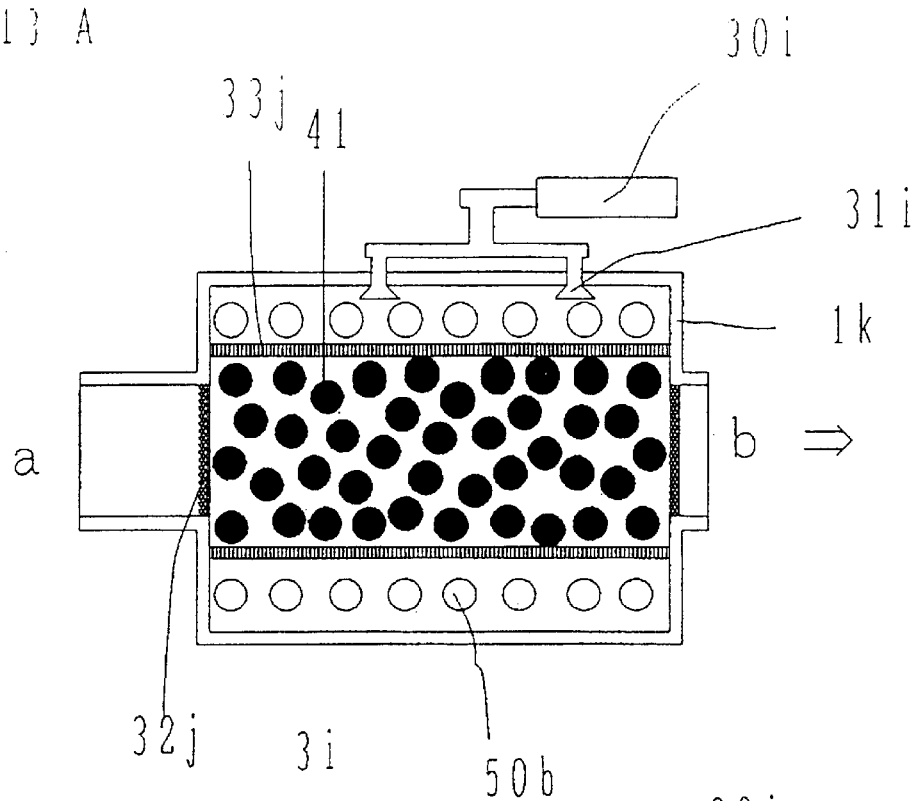
FIGS. 13A and 13B are views showing an example in which to an apparatus for generating the ozone or the corona by exciting a heat resistance dielectric ball according to the present invention a structure for adding an induction heating and an ozone or a corona generating portion using a high voltage discharge wire.
Figure 13:
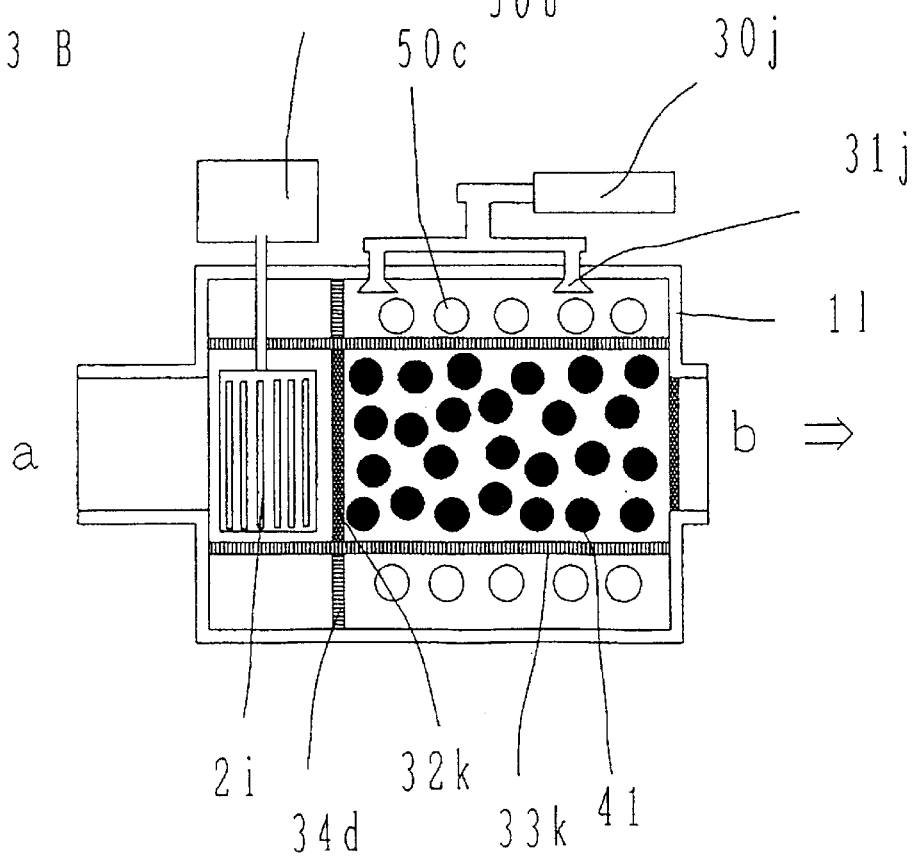

FIGS. 13A and 13B show a construction in which in the construction shown in FIGS. 11A and 11B, additionally, induction heating heaters 50b and 50c and a resistance heater (not shown in figure) are added, and then the functions are activated further. A reference numeral 3i is a high voltage power source, a reference numeral 2i is a corona generating unit, reference numerals 30I and 30j are microwave generating means, reference numerals 31I and 31j are microwave injecting nozzles, reference numerals 32j and 32k are isolating walls, reference numerals 33j and 33k are heat resistance dielectric property isolating walls, a reference numeral 34d is an isolating wall b, and reference numerals 1k and 1l are corona generating vessels.

The above stated corona and ozone generating apparatus have the comparative simple construction in comparison with those of the conventional apparatus and the ozone can be generated accompanying with the large of quantity of the corona during the discharge time and it can utilize to the fields in which the corona and the ozone necessities. The usefulness is excellent. In addition to those, it can be utilized effectively to the sterilization and the deodorization, the environmental pollution countermeasure in an automobile, a boiler, an engine etc., the chemical reaction promotion, the combustion promotion, and the decomposition of the harmful materials etc.

Further, the corona generating apparatus and the ozone generating apparatus can be manufactured according to the production technique such as the electric wire, the optical fiber and the electronic oven etc., accordingly the corona generating apparatus and the ozone generating apparatus having the superior quality and the superior productivity and having the simple construction and the low cost can be provided. Further, the corona generating apparatus and the zone generating apparatus, in which the decomposition of the harmful materials under the high atmosphere such as the automobile, the engine and the boiler etc. can be corresponded and the corona generating mechanism according to the microwaves and the cooling structure can be attained and further the easy maintenance enable to correspond at real time, can be provided.

According to the present invention, between the bare electrodes which are adhered closely contact along to the outer skin of the long and narrow electrode which is covered by the insulated material, using the comparative low high voltage direct current or the alternating current the corona discharge is occurred, and the ozone can be generated effectively. According to the present invention, in the inside and the outside of the ozone generating vessel between the high voltage electrodes are isolated electrically and completely, and during the use time the occurrences of the electric leakage and the spark according to the dusts and NOx generated according to the corona in the vicinity of the electrode can be lessened and in comparison with the conventional machine and the apparatus the maintenance period can be lengthened widely.

Further, it is possible to generate effectively the ozone and the corona by the provision of the oxygen generating means and without the occurrence of NOx. Since the apparatus has the functions having the cleaning enable to remove of the dusts and NOx in the machine and the apparatus, the removal, and the drying, against the conventional machine and apparatus which necessities frequently the maintenance, the remarkable maintenance free can be realized.

To the insulated material, since Teflon having the high heat resistance property, the heat resistance silicone resin, the glass, and the ceramics can be applied easily, it is possible to generate the ozone and the cornea under the high temperature atmosphere. Since in the hollow shape electrode the liquid electrolyte is used and circulated, it is possible to give the cooling function and further it is possible to widen the range under the high temperature atmosphere. Further, by raising the heat resistance property, during the cleaning time, during the adhered dusts removal time and during the reaction promotion time, by the electric current applying to the electrode it can work as the heater, the effect can be heightened.

To raise the ozone and the corona generation, the shape of the bare electrode, which is laid down closely contact to the outer skin of the insulated core wire, can be formed with the parallel single wire, the spiral shape and the net shape and further to the outer face of the element wire the projection etc. is formed. By overlapping to the direct current high voltage and by varying the pulse which is applied singly, by the frequency number of the high frequency, and by varying periodically the frequency number, it is possible to generate easily the ozone and the corona.

To the outer skin of the insulated core wire and the inner face of the ozone and the corona generating vessel, the active oxygen is generated using the ultraviolet rays and by coating the thickener oxide metals, for example titanium oxide and the palladium etc. much active oxygen, which is bathed directly the ultraviolet rays generated on the vicinity bare electrode during the corona and the ozone generating time, can be generated and the ozone generation can be promoted. Further, according to the present invention, in the cloth shape ozone and corona generating apparatus, by folding the one sheet and by overlapping plural sheets, the mechanical filter function is given and with this a complex function enable for the ozone and the corona generation can be given.

Further, since the ozone generation according to the microwaves and the corona generation, the heating can be combined singly and additionally the above stated ozone and the corona generating apparatus, the epoch-making apparatus having the performance, the safety and the productivity can be constituted.

As to the productivity, since the ozone and the corona generating unit according to the present invention is formed with the long and narrow single electrode pair and the plural electrode pairs, it can be manufactured easily according to the manufacture technique according the electric wire and the optical fiber. The ozone and the corona generation unit can be constituted by arranging random and arranging the interval between electrodes without the difficulty, in comparison the conventional complicated ozone and the corona generating apparatus having the needle electrode, the productivity can be made up remarkably and it is possible to perform the wide cost reduction.

What is claimed is:

1. An ozone generating apparatus comprising at least two electrodes, wherein
    one of the at least two electrodes is formed with a long line shape, a band shape, a rod shape, or a plate shape, and is covered by an outer skin made of an insulated material, and
    another of said at least two electrodes is formed by a bare wire corresponding to the shape of said one of said at least two electrodes and is arranged closely in contact therewith and having a parallel shape, a spiral shape, a net shape, or a zigzag shape, along to the one of the at least two electrodes.

2. An ozone generating apparatus according to claim 1, wherein the apparatus further includes an ozone generating vessel, and includes terminals respectively electrically connected to the electrodes, and wherein
    a single or plural ozone generating portions are arranged in the ozone generating vessel, between the terminals by forming a suitable insulating distance or by isolating said insulated material, and said terminals are united manually and are installed at an outside of the ozone generating vessel.

3. An ozone generating apparatus according to claim 1, wherein the apparatus further comprises an ozone generating vessel, and
    at an outside of the ozone generating vessel, a nitrogen removing device is installed,
    said ozone generating vessel is formed substantially under an oxygen atmosphere and the ozone is generated, without the occurrence of NOx, and
    said insulated material of said outer skin of said one of the at least two electrodes is formed of one selected from the group consisting of a heat resistance material, an arc resistance material, and a base resistance material.

4. An ozone generating apparatus according to claim 1, wherein
    the insulated material of said outer skin of said one of the at least two electrodes is formed of one selected from the group consisting of a high heat resistance material, a high arc resistance material, and a high base resistance material.

5. An ozone generating apparatus according to claim 1, wherein
    a shape of said bare wire is formed of one selected from the group consisting of a thin single wire being laid down in parallel along to said one electrode, a net shape being covered to a surface of said one electrode, a spiral shape being laid down, and a projecting portion being fuzzed to an element wire.

6. An ozone generating apparatus according to claim 1, wherein
    a corona discharge is generated with one selected from the group consisting of by overlapping to a high voltage direct current, by changing a pulse for applying singly, by varying a frequency number of an alternating current, and by varying frequency number periodically.

7. An ozone generating apparatus according to claim 1, wherein the one and the another of said at least two electrodes are provided in an ozone generating vessel, wherein a titanium oxide coating is provided on the outer skin of said one of the at least two electrodes and on a side of said ozone generating vessel, and wherein
    an ozone generation is promoted according to an occurrence of an active oxygen by the titanium oxide which is coated to said outer skin and the side of said ozone generating vessel.

8. An ozone generating apparatus according to claim 1, wherein
    a corona generating unit is formed with one selected from the group consisting of a long and narrow single electrode pair, and plural electrode pairs, and
    said long and narrow single electrode pair or said plural electrode pairs is inserted into an ozone generating vessel.

9. An ozone generating apparatus according to claim 1, wherein a corona generating unit is formed with one selected from the group consisting of a cloth shape material comprised of a narrow and long insulated core wire and a discharge wire, and a laminated shape material being laminated alternatively a cloth shape material of comprised of a narrow and long insulated core and a discharge wire.

10. An ozone generating apparatus according to claim 1, wherein said one of the at least two electrodes in an ozone generating vessel is formed with a hollow shape portion, and to said hollow shape portion of said one of the at least two electrodes an electrolyte is filled up and said one of the at least two electrodes works a role of an electrode.

11. An ozone generating apparatus according to claim 1, wherein said bare wire for generating a corona discharge and being along to said one of the at least two electrodes is formed with a carbon wire.

12. An ozone generating apparatus according to claim 1, wherein the apparatus includes an ozone generating vessel filled with metal particle material, and wherein an electromagnetic wave having a microwave length is irradiated from an outside of said ozone generating vessel filled with the metal particle material, a corona discharge is generated from said metal particle material, and an organic gas or a harmful gas is decomposed according to a catalyst action.

13. An ozone generating apparatus according to claim 12, wherein a high voltage corona generating means and an ozone and a corona generating mean including said metal particle material are combined, where functions selected from the group consisting of a sterilization, a deodorization, a gas composition, and a chemical reaction of the ozone generating apparatus is heightened.

14. An ozone generating apparatus according to claim 12, wherein said one of the at least two electrodes, and said metal particle material, are placed in a glass vessel or a ceramics vessel as the ozone generating vessel, and wherein a corona discharge according to a high voltage and a corona discharge according to microwaves are generated on a surface of said metal particle material at the same time.

15. An ozone generating apparatus according to claim 12, wherein said metal particle material is comprised of a conductive property metal particle material and a non-conductive property metal particle material.

16. An ozone generating apparatus according to claim 12, wherein the ozone generating apparatus further includes a heating means of the metal particle material, and, as the heating means of said metal particle material, a microwave heating, an induction heating, and a resistance heating are combined.

17. An ozone generating apparatus according to claim 1, wherein the apparatus further includes a heat resistance dielectric ball material, which is adapted to be induction-heated according to microwaves.

18. An ozone generating apparatus according to claim 17, wherein a high voltage corona generating means and an ozone and a corona generating means including said heat resistance dielectric ball material are combined, and wherein functions selected from the group consisting of a sterilization, a deodorization, a gas composition, and a chemical reaction of the ozone generating apparatus is heightened.

19. An ozone generating apparatus according to claim 17, wherein the apparatus further includes a dielectric particle material and a high voltage discharge wire which are combined, and wherein said dielectric ball material is adapted to be induction-heated according to microwaves.

20. An ozone generating apparatus according to claim 1, wherein the ozone generating apparatus further includes a heating source, and, as the heating source, a heater having an induction-heating or an electric resistance heating is provided.

21. A corona generating apparatus, wherein the corona generating apparatus used in an air is constituted by one selected from the ozone generating apparatus defined in claims 1–3 and 5–16.

* * * * *